April 16, 1968     R. STOKES     3,378,241

EXHAUST PURIFIER

Filed Jan. 17, 1966     2 Sheets-Sheet 1

INVENTOR.
RUFUS STOKES
BY Edward C. Threedy
HIS ATTORNEY.

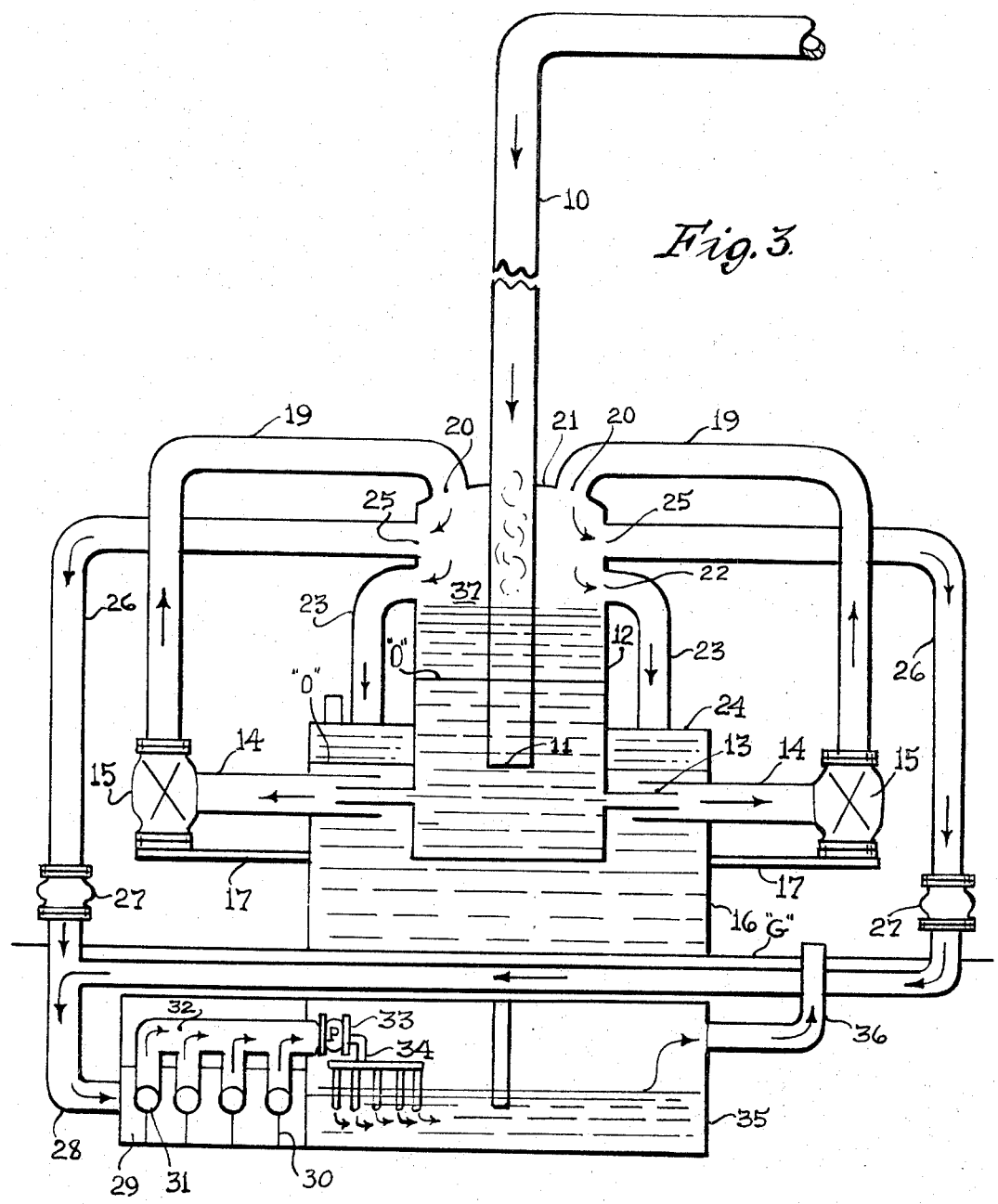

3,378,241
EXHAUST PURIFIER
Rufus Stokes, Chicago, Ill., assignor to R.S. Engineering Company, Inc., Chicago, Ill., a corporation of Illinois
Filed Jan. 17, 1966, Ser. No. 520,927
8 Claims. (Cl. 261—121)

A principal object of this invention is to provide in an apparatus of this character a system utilizing a recirculating liquid bath having a scrubbing and settling action on the exhaust introduced into the system, for effectively eliminating the impurities therein.

A further object of this invention is to provide in an apparatus of this character a series of liquid baths and a system for recirculating the exhaust gas-liquid mixture through a novel arrangement of pumps and blowers operatively connected with an exhaust induction tank, a recirculation tank, and a settling tank, through which the exhaust to be purified is caused to ascend before being dispersed into the atmosphere.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 3 is a diagrammatical sectional view of the exhaust purifier showing the path of circulation therethrough.

Figure 1:
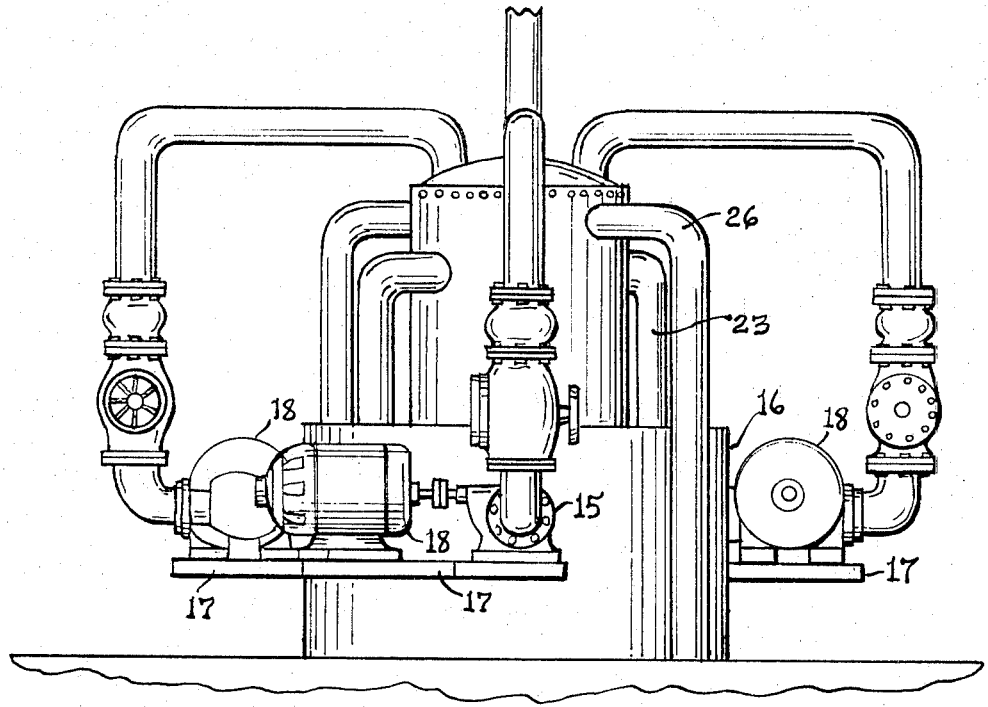
FIG. 1 is a side elevational view of my exhaust purifier.
Figure 2:
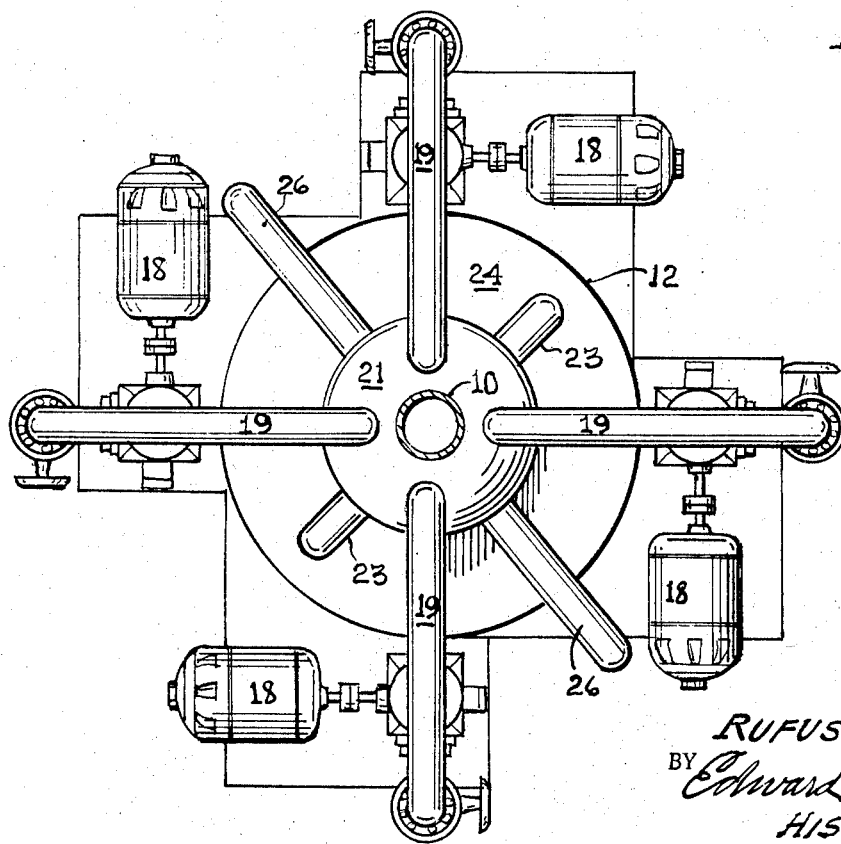
FIG. 2 is a top plan view of my exhaust purifier.

There are presently two methods of purifying combustion exhausts. One type incorporates a liquid spray wherein the fumes and gases are sprayed with water whereby the impurities are absorbed in the droplets which fall into and settle on the bottom of a settling tank. Another known system is the liquid solution type wherein the exhaust is caused to pass through a body of liquid which collects the impurities.

The fallacy of these present types of exhaust purifiers is found in the fact that they are unable to trap and separate the extremely fine particles and impurities. Generally the large particles are easily trapped by means of baffles and the scouring action of the water, and the large particles will thereby be caused to settle. However, bubbles of air or other gas may be created which surround the finer solid particles and make it difficult to remove those particles from the air or other gas being purified. These bubbles enclose the fine particles and as a result act as a protective shield around the particles. Because of this shielding action, the bubbles carry the particles upward to the surface of the water, where they will again become distributed into the air.

The present invention pertains to a relatively simple and inexpensive apparatus which traps and removes both large and fine impurities from exhaust fumes. Referring to FIG. 3, I fragmentarily show an exhaust pipe or smokestack 10 which may be a part of an incinerator or the like. This exhaust pipe 10 terminates into a downwardly directed opening 11 submerged beneath a liquid level contained in a circularly formed induction tank 12. Extending radially from the side wall of the tank 12 are a pluralty of outlet ports 13. These outlet ports 13 are in turn surrounded by the inner open end of enlarged induction conduits 14 which in turn provide intakes for a like number of agitating pumps 15. These induction conduits 14 are carried by and extend through the circular wall of a liquid filled recirculation tank 16, which, as is shown in FIG. 3, surrounds the lower interior end of the induction tank 12 and the outlet ports 13, which are immersed in the liquid filling the tank 16. Also carried by the wall of the recirculation tank 16 are supporting platforms 17 upon which are mounted the agitator pumps 15 as well as their associated electrical drive motors 18.

Connected to the outlets of the agitator pumps 15 are recirculating conduits 19 which terminate into exhaust ports 20 formed in the roof 21 of the induction tank 12. Formed in the side walls of the induction tank 12 above the liquid level and beneath the exhaust port 20 is a pair of openings 22 which have communication with recirculating conduits 23. These recirculating conduits 23 terminate in like openings formed in the top wall 24 of the recirculation tank 16.

Also formed in the side wall of the induction tank 12 are openings 25 which have communication with a pair of feed-off conduits 26. Located in each of the feed-off conduits 26 is a blower 27 which has its exhaust port connected to a feed-in conduit 28. The feed-in conduit 28 has open communication with a final mixing tank 29. The mixing tank 29 is divided into a series of open compartments by partial baffles 30 extending in opposite directions from the top and bottom walls thereof, shown schematically in FIG. 3. Within each of the compartments of the mixing tank 29 is an impeller 31 connected to a manifold 32 which in turn terminates into an exhaust pump 33 having operative connection with a series of discharge pipes 34 (only one being shown) carried within a settling tank 35. The settling tank 35 is partially filled with a final liquid bath which covers the open free ends of the exhaust pipes 34. Out of the settling tank 35 I provide a suitable exhaust stack 36 which has open and free communication with the atmosphere.

As shown in the accompanying drawings, the mixing tank 29 and settling tank 35 are depicted as being beneath the ground level G. This is the preferred arrangement but the same could be situated in any relation with respect to the induction tank 12 and recirculation tank 16 without departing from the teachings of this invention.

In operation, when the incinerator (not shown) or the like, is operated to create an exhaust, the same will pass through the stack 10 and into the induction tank 12 where it is forced into the liquid bath contained therein. When the agitator pumps 15 are energized, they will draw off the fume and liquid mixture not only from the induction tank 12 but also the liquid contained in the recirculation tank 16 and the fluid level line will drop to the position designated O. These pumps 15 will force the mixture through the recirculating conduits 19 whereby the mixture is once again introduced into the vacant top portion of the induction tank 12. Here the heavier particles will fall by gravity into the liquid in the induction tank 12. The lighter particles will be drawn into the conduits 26 by the operation of the blowers 27 and be forced into the mixing tank 29 whereby the impellers will disintegrate any and all air bubbles surrounding the impurities and larger droplets of water containing impurities before the exhaust is drawn by the pump 33 into the settling tank 35 from which only the scrubbed and purified air will escape through the exhaust conduit 36.

The circulated admixture of fumous-liquid-exhaust forced by the agitating pumps 15 through the recirculating conduits 19 will pass into a pressure chamber 37 formed in the uppermost vacant portion of the induction tank 12. This circulation of admixed exhaust creates a backpressure upon the liquid surface O within the induction tank 12 and forms a barrier that prevents escape of the induced exhaust out of the liquid before the admixture of fumous-liquid exhaust is circulated by the agitating pumps 15. To relieve this created backpressure within the pressure chamber 37 of the induction tank 12 a given amount of admixed exhaust will pass through the recirculating conduits 23 and shunted into the recirculating tank 16 where it will again be cleansed by the liquid before starting the aforesaid cycle of circulation created by the agitating pumps 15.

The agitation of the liquid within the tank 16 is created through the open communication the tank 16 has with the enlarged induction conduits 14 associated with the agitating pumps 15, which pumps 15 by lowering the liquid level within the tanks 12 and 16 efficiently effect a draft therethrough for recirculating the larger air-borne impurities through the system.

While I have shown a device including four agitating pumps 15, it should be readily understood that the number may be increased or decreased depending upon the amount of exhaust to be purified. In the device as shown in the drawings, after an initial starting period, it has been found practical to continuously operate the apparatus with only two of the four pumps in operation without departing from the effectiveness of recirculating the liquid-gas mixture throughout the system.

It is also to be understood that the device may be equipped with a liquid supply source as well as suitable access doors for cleansing each of the respective tanks to remove the impurities collected therein.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variation and modifications as come within the scope of the appended claims.

Having thus described my invention, what I claim as new and desire to protect by Letters Patent is:

1. An exhaust purifier for treating and purifying the exhaust from combustion chambers including an exhaust stack, said purifier comprising
    (a) an exhaust induction tank surrounding the open end of the exhaust stack of the combustion chamber,
    (b) said tank partially liquid-filled to provide a pressure chamber in the vacant portion thereof and with the open end of the exhaust stack immersed in the liquid within said tank,
    (c) a liquid-filled recirculation tank into which a portion of the exhaust induction tank is immersed,
    (d) means provided by the said vacuum induction tank and said recirculating tank forming a restricted communication between the liquid-filled portion of said exhaust induction tank and said recirculation tank,
    (e) circulating means carried externally of said recirculation tank and having open communication therewith for mixing and circulating the liquids in said tanks through said exhaust purifier,
    (f) conduit means connecting said means with the pressure chamber of said exhaust induction tank for circulating therethrough an admixture of fumous-liquid exhaust to create a pressure barrier upon the exposed surface of the liquid contained in said induction tank,
    (g) means providing open communication between said pressure chamber of said exhaust induction tank and said recirculation tank for shunting a portion of the fumous-liquid exhaust out of the pressure chamber and into said recirculation tank to relieve back-pressure created in the pressure chamber of said induction tank,
    (h) conduit means for connecting a portion of said pressure chamber with a liquid-filled mixing tank,
    (i) a liquid filled mixing tank for receiving the admixture of fumous-liquid exhaust from said pressure chamber of said induction tank,
    (j) means within said mixing tank for scrubbing said admixture with additional liquids,
    (k) conduit means for passing the scrubbed exhaust into a liquid-filled settling tank,
    (l) a settling tank connected to said mixing tank by said last named conduit means for receiving said scrubbed exhaust, and
    (m) an exhaust port carried by said settling tank for exhausting the purified exhaust into the atmosphere.

2. An exhaust purifier as defined by claim 1 wherein said means forming a restricted communication between said exhaust induction tank and said recirculation tank comprise an open end restricted outlet port provided by said exhaust induction tank projecting into and spaced from an open end induction conduit provided by said recirculation tank and of a length to extend externally thereof.

3. An exhaust purifier as defined by claim 1 wherein said circulation means comprises an agitator type pump.

4. An exhaust purifier as defined by claim 1 wherein said means providing open communication between the pressure chamber of said exhaust induction tank and said recirculation tank include a recirculating conduit providing open communication between said pressure chamber and the top wall of said recirculation tank so as to provide a by-pass for excess admixture of fumous-liquid exhaust circulated into said pressure chamber.

5. An exhaust purifier as defined by claim 1 wherein said means within said mixing tank for scrubbing said admixture of fumous-liquid exhaust comprises a mixing impeller.

6. An exhaust purifier as defined by claim 1 wherein said circulating means comprises an agitator type pump and further defined by including as a means within said mixing tank for scrubbing said admixture of fumous-liquid exhaust a mixing impeller.

7. An exhaust purifier as defined by claim 1 wherein said means forming a restricted communication between said exhaust induction tank and said recirculation tank comprises an open end outlet port provided by said exhaust induction tank projecting into and spaced from an open end induction conduit provided by said recirculation tank and extending exteriorly thereof, with the device further defined by including as said means providing open communication between said pressure chamber of said exhaust induction tank and said recirculation tank a recirculating conduit therebetween which provides a pressure relieving by-pass for excess admixture of fumous-liquid exhaust circulated into said pressure chamber.

8. An exhaust purifier as defined by claim 1 wherein said liquid filled mixing tank includes a plurality of partial compartments formed by a plurality of baffles which cooperate to scrub the fumous-liquid exhaust circulated therein.

References Cited
UNITED STATES PATENTS

| | | | |
|---|---|---|---|
| 1,261,106 | 4/1918 | Crisfield | 55—256 XR |
| 1,684,068 | 4/1927 | Moon | 261—121 |
| 2,920,946 | 1/1960 | Weaver et al. | 261—121 XR |
| 3,321,191 | 5/1967 | Najarian | 261—123 XR |

FRANK W. LUTTER, *Primary Examiner.*

E. H. RENNER, *Assistant Examiner.*